(12) United States Patent
Wang

(10) Patent No.: US 10,574,752 B2
(45) Date of Patent: Feb. 25, 2020

(54) DISTRIBUTED DATA STORAGE METHOD, APPARATUS, AND SYSTEM

(71) Applicant: Huawei Technologies Co., Ltd., Shenzhen (CN)

(72) Inventor: Yuhu Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 15/206,445

(22) Filed: Jul. 11, 2016

(65) Prior Publication Data
US 2016/0323385 A1     Nov. 3, 2016

Related U.S. Application Data

(63) Continuation of application No. PCT/CN2015/071423, filed on Jan. 23, 2015.

(30) Foreign Application Priority Data

Jan. 26, 2014    (CN) .......................... 2014 1 0038922

(51) Int. Cl.
    *G06F 17/30*      (2006.01)
    *H04L 29/08*      (2006.01)
    (Continued)

(52) U.S. Cl.
    CPC ...... *H04L 67/1097* (2013.01); *G06F 16/2471* (2019.01); *G06F 16/278* (2019.01)

(58) Field of Classification Search
    CPC ........... H04L 67/1097; G06F 17/30545; G06F 17/30584; G06F 16/2471; G06F 16/278
    See application file for complete search history.

(56) References Cited

U.S. PATENT DOCUMENTS

2007/0005797 A1    1/2007   Fontijn et al.
2008/0016240 A1    1/2008   Balandin
    (Continued)

FOREIGN PATENT DOCUMENTS

CN        1778089 A     5/2006
CN    101291321 A    10/2008
    (Continued)

OTHER PUBLICATIONS

Partial English Translation and Abstract of Chinese Patent Application No. CN102831120, Dec. 19, 2012, 21 pages.
(Continued)

*Primary Examiner* — Huawen A Peng
(74) *Attorney, Agent, or Firm* — Conley Rose, P.C.

(57) ABSTRACT

A distributed data storage method, apparatus, and system are disclosed. After a first node receives a query request that comprises a query identifier, if first data corresponding to the query identifier is stored locally, but second data corresponding to the query identifier is not stored locally, the first node recalculates a second node configured to store the first data, and sends storage location information of the first data to the second node. The second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

15 Claims, 6 Drawing Sheets

```
┌──────────────────────────────────────────────────────┐
│  A first node receives a first query request sent    │
│  by a service apparatus, where the first query       │──── S101
│  request carries a query identifier, and the query   │
│  identifier corresponds to first data and second data│
└──────────────────────────────────────────────────────┘
                          │
                          ▼
┌──────────────────────────────────────────────────────┐
│  If the first node stores the first data and does not│
│  store the second data, the first node obtains,      │──── S102
│  according to the query identifier and a preset      │
│  calculation rule, a second node configured to store │
│  the first data                                      │
└──────────────────────────────────────────────────────┘
                          │
                          ▼
┌──────────────────────────────────────────────────────┐
│  The first node sends storage location information   │──── S103
│  of the first data to the second node                │
└──────────────────────────────────────────────────────┘
```

(51) Int. Cl.
*G06F 16/2458* (2019.01)
*G06F 16/27* (2019.01)

(56) References Cited

U.S. PATENT DOCUMENTS

| | | | |
|---|---|---|---|
| 2009/0070337 | A1 | 3/2009 | Romem et al. |
| 2010/0082671 | A1 | 4/2010 | Li et al. |
| 2012/0109888 | A1 | 5/2012 | Zhang et al. |
| 2012/0203737 | A1 | 8/2012 | Golos et al. |
| 2012/0317093 | A1 | 12/2012 | Teletia et al. |
| 2013/0185329 | A1 | 7/2013 | Bartolome et al. |
| 2016/0328167 | A1 | 11/2016 | Fuente et al. |

FOREIGN PATENT DOCUMENTS

| | | |
|---|---|---|
| CN | 101485178 A | 7/2009 |
| CN | 101685449 A | 3/2010 |
| CN | 101916261 A | 12/2010 |
| CN | 102577278 A | 7/2012 |
| CN | 102831120 A | 12/2012 |
| CN | 102866995 A | 1/2013 |
| CN | 102891872 A | 1/2013 |
| CN | 102968498 A | 3/2013 |
| EP | 2091184 A1 | 8/2009 |
| WO | 2008038271 A1 | 4/2008 |
| WO | 2012041404 A1 | 4/2012 |
| WO | 2014000822 A1 | 1/2014 |

OTHER PUBLICATIONS

Mukherjee, N., "Non-Replicated Dynamic Fragment Allocation in Distributed Database Systems," XP009168803, Advances in Computer Science and Information Technology, vol. 131, Jan. 2011, pp. 560-569.
Kumar, R., et al., "An Extended Approach to Non-Replicated Dynamic Fragment Allocation in Distributed Database Systems," XP032583841, International Conference on Issues and Challenges in Intelligent Computing Techniques, Feb. 7-8, 2014, 5 pages.
Foreign Communication From a Counterpart Application, European Application No. 15740943.4, Extended European Search Report dated Dec. 7, 2016, 15 pages.
Foreign Communication From a Counterpart Application, PCT Application No. PCT/CN2015/071423, English Translation of International Search Report dated Apr. 29, 2015, 2 pages.
Foreign Communication From a Counterpart Application, PCT Application No. PCT/CN2015/071423, English Translation of Written Opinion dated Apr. 29, 2015, 6 pages.
Machine Translation and Abstract of Chinese Publication No. CN102866995, Jan. 9, 2013, 11 pages.
Machine Translation and Abstract of Chinese Publication No. CN102891872, Jan. 23, 2013, 12 pages.
Machine Translation and Abstract of Chinese Publication No. CN102968498, Mar. 13, 2013, 19 pages.
Yunqin, Z., et al., "A distributed storage scheme for Big spatio-temporal data," Dec. 23, 2013, p. 1219-1229.
Dao, T., et al., "Distributed Graph Storage and Query System for CW I," Journal of Guangxi Normal University Natural Science Edition, vol. 27, No. 1, Mar. 2009, pp. 125-128.
Wang, L., et al., "Distributed Storage Model for Continuous Data Protection," Journal of Chinese Computer Systems, vol. 32, No. 8, Aug. 8, 2011, 6 pages.
Yao, L., et al., "Solution of NoSQL Distributed Storage and Extension," vol. 38, No. 6, Mar. 2012, 40-42 pages.
Foreign Communication From a Counterpart Application, Chinese Application No. 201410038922.1, Chinese Office Action dated Aug. 7, 2017, 7 pages.

DISTRIBUTED DATA STORAGE METHOD, APPARATUS, AND SYSTEM

CROSS-REFERENCE TO RELATED APPLICATIONS

This application is a continuation of International Application No. PCT/CN2015/071423, filed on Jan. 23, 2015, which claims priority to Chinese Patent Application No. 201410038922.1, filed on Jan. 26, 2014, both of which are hereby incorporated by reference in their entireties.

TECHNICAL FIELD

Embodiments of the present disclosure relate to information technologies, and in particular, to a distributed data storage method, apparatus, and system.

BACKGROUND

A massively parallel processing (MPP) system is a common distributed database architecture. The MPP architecture distributes data to multiple database nodes such that the multiple nodes perform parallel processing, to improve a processing speed. According to a specific method, when a data table is established, a column is selected from the data table as a partition column. Data values included in rows in data tables are stored on database nodes in a distributed manner using a uniform partitioning function.

In the prior art, when a node receives a query request, if data in at least two data tables queried by means of the query request has associated columns, and is stored on at least two nodes in a distributed manner, distributed data re-storage is triggered such that the data that has the associated columns and that is in the at least two data tables is stored on a same node.

However, this distributed re-storage method consumes network data transmission resources and wastes storage space.

SUMMARY

Embodiments of the present disclosure provide a distributed data storage method, apparatus, and system, to overcome a problem in the prior art that distributed re-storage consumes network data resources and wastes storage space.

A first aspect of the embodiments of the present disclosure provides a distributed data storage method, where a distributed system includes a service apparatus and multiple nodes, the multiple nodes are used for distributed data storage, the service apparatus is configured to access data stored on the nodes, and the method includes receiving, by a first node, a first query request sent by the service apparatus, where the first query request carries a query identifier, and the query identifier corresponds to first data and second data, if the first node stores the first data and does not store the second data, obtaining, by the first node according to the query identifier and a preset calculation rule, a second node configured to store the first data, and sending, by the first node, storage location information of the first data to the second node.

With reference to the first aspect, in a first possible implementation manner of the first aspect, after the sending, by the first node, storage location information of the first data to the second node, the method further includes receiving, by the first node, a second query request sent by the second node, where the second query request is sent by the second node after the second node receives a request that is used by the service apparatus to query the first data, and sending, by the first node, the first data to the service apparatus.

With reference to the first aspect, in a second possible implementation manner of the first aspect, after the sending, by the first node, storage location information of the first data to the second node, the method further includes receiving, by the first node, a second query request sent by the second node, where the second query request is sent by the second node after the second node receives a request that is used by the service apparatus to query the first data, and sending, by the first node, the first data to the second node such that the second node returns the first data to the service apparatus.

With reference to the first aspect or either of the first and second possible implementation manners of the first aspect, in a third possible implementation manner of the first aspect, after the sending, by the first node, storage location information of the first data to the second node, the method further includes receiving, by the first node, a data addition request sent by the service apparatus, where the data addition request is used to add third data to the first data, adding, by the first node, the third data to the first data, determining, by the first node according to the query identifier, a third node configured to store the third data, and sending, by the first node, storage information of the third data to the third node.

With reference to the first aspect or either of the first and second possible implementation manners of the first aspect, in a fourth possible implementation manner of the first aspect, after the sending, by the first node, storage location information of the first data to the second node, the method further includes receiving, by the first node, a data deletion request sent by the service apparatus, where the deletion request is used to delete fourth data from the first data, deleting, by the first node, the fourth data from the first data, determining, by the first node according to the query identifier, at least one fourth node that stores the fourth data, and sending, by the first node, storage location information of the fourth data to the corresponding fourth node.

With reference to the first aspect or any one of the first to fourth possible implementation manners of the first aspect, in a fifth possible implementation manner of the first aspect, the calculating, by the first node according to the query identifier, a second node configured to store the first data is performing, by the first node, hash calculation according to the query identifier, to determine the second node configured to store the first data.

A second aspect of the embodiments of the present disclosure provides a distributed database node, where a distributed system includes a service apparatus and multiple distributed database nodes, the multiple distributed database nodes are used for distributed data storage, the service apparatus is configured to access data stored on the distributed database node, and the distributed database node includes a receiving module configured to receive a first query request sent by the service apparatus, where the first query request carries a query identifier, and the query identifier corresponds to first data and second data, a storage module configured to store data, a processing module configured to, if the storage module stores the first data and does not store the second data, obtain, according to the query identifier and a preset calculation rule, a second node configured to store the first data, and a sending module configured to send storage location information of the first data to the second node.

With reference to the second aspect, in a first possible implementation manner of the second aspect, the receiving module is further configured to receive a second query request sent by the second node, where the second query request is sent by the second node after the second node receives a request that is used by the service apparatus to query the first data, and the sending module is further configured to send the first data to the service apparatus.

With reference to the second aspect, in a second possible implementation manner of the second aspect, the receiving module is further configured to receive a second query request sent by the second node, where the second query request is sent by the second node after the second node receives a request that is used by the service apparatus to query the first data, and the sending module is further configured to send the first data to the second node such that the second node returns the first data to the service apparatus.

With reference to the second aspect or either of the first and second possible implementation manner of the second aspect, in a third possible implementation manner of the second aspect, the receiving module is further configured to receive a data addition request sent by the service apparatus, where the data addition request is used to add third data to the first data, the processing module is further configured to add the third data to the first data stored in the storage module, the processing module is further configured to determine, according to the query identifier, a third node configured to store the third data, and the sending module is further configured to send storage information of the third data to the third node.

With reference to the second aspect or either of the first and second possible implementation manner of the second aspect, in a fourth possible implementation manner of the second aspect, the receiving module is further configured to receive a data deletion request sent by the service apparatus, where the deletion request is used to delete fourth data from the first data, the processing module is further configured to delete the fourth data from the first data stored in the storage module, the processing module is further configured to determine, according to the query identifier, at least one fourth node that stores the fourth data, and the sending module is further configured to send storage location information of the fourth data to the corresponding fourth node.

With reference to the second aspect or any one of the first to fourth possible implementation manners of the second aspect, in a fifth possible implementation manner of the second aspect, the processing module is configured to perform hash calculation according to the query identifier, to determine the second node configured to store the first data.

A third aspect of the embodiments of the present disclosure provides a distributed database node, where a distributed system includes a service apparatus and multiple distributed database nodes, the multiple distributed database nodes are used for distributed data storage, the service apparatus is configured to access data stored on the distributed database node, and the distributed database node includes a first memory configured to store an instruction, a second memory configured to store data, and a processor configured to run the instruction stored in the first memory, to execute the method according to the first aspect.

A fourth aspect of the embodiments of the present disclosure provides a distributed data storage system, including a service apparatus and multiple distributed database nodes according to the second aspect, where the multiple distributed database nodes are used for distributed data storage, and the service apparatus is configured to access data stored on the distributed database nodes.

A fifth aspect of the embodiments of the present disclosure provides a distributed data storage system, including a service apparatus and multiple distributed database nodes according to the third aspect, where the multiple distributed database nodes are used for distributed data storage, and the service apparatus is configured to access data stored on the distributed database nodes.

According to the distributed data storage method, apparatus, and system provided in the embodiments of the present disclosure, after a first node receives a query request that carries a query identifier, if first data corresponding to the query identifier is stored locally, but second data corresponding to the query identifier is not stored locally, the first node recalculates, according to the query identifier and a preset calculation rule, a second node configured to store the first data, the first node does not need to send the first data to the second node, and instead, sends storage location information of the first data to the second node, the second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A distributed database system includes at least one service apparatus and multiple distributed database nodes. These distributed database nodes are used for distributed data storage, stored data usually may exist in a form of a data table, and the service apparatus is configured to access data stored on the nodes.

In the embodiments of the present disclosure, the distributed system initially stores data according to a particular preset calculation rule, and may initially store data in a distributed manner by means of hash calculation. When a user sends a service query request using a client, the service apparatus receives the request, generates a corresponding data query request, and sends the corresponding data query request to all nodes in the system. Each node analyzes whether data to which the data query request points exists locally. If data to which the data query request points exists locally, the node performs a corresponding query operation, or if data to which the data query request points does not exist locally, the node does not perform a subsequent operation.

Figure 1:
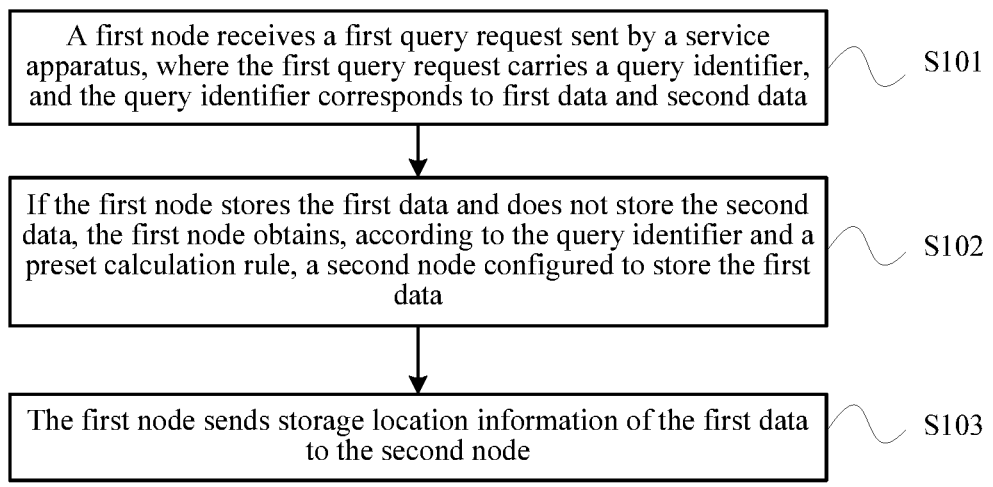
FIG. 1 is a flowchart of an embodiment of a distributed data storage method according to the present disclosure.

FIG. 1 is a flowchart of an embodiment of a distributed data storage method according to the present disclosure. As shown in FIG. 1, the method includes:

S101. A first node receives a first query request sent by a service apparatus, where the first query request carries a query identifier, and the query identifier corresponds to first data and second data.

S102. If the first node stores the first data and does not store the second data, the first node obtains, according to the query identifier and a preset calculation rule, a second node configured to store the first data.

S103. The first node sends storage location information of the first data to the second node.

The first node may be any distributed database node in a distributed system. During initial distributed data storage, the distributed system usually performs calculation according to an identifier and a preset calculation rule, to store data on nodes in the system in a distributed manner, where the identifier involved above may be, for example, a student number, a grade, or a name, and the preset calculation rule usually may be a hash algorithm.

For example, during initial distributed data storage, the distributed system performs hash calculation according to the "student number", and stores the first data on the first node and stores the second data on another node in the system, for example, a third node. In this embodiment of the present disclosure, it is assumed that the query identifier in the first query request received by the first node is a "name of somebody", the first data corresponding to the "name of somebody" is a "student number" corresponding to the name, the second data is a "grade" corresponding to the name, and the "student number" corresponding to the name is stored on the first node, but the "grade" corresponding to the name is stored on another node, for example, the third node. Then the first node performs hash calculation according to the "name", and re-determines that a node configured to store the first data is the second node. After the first node determines the second node, the first node needs to send only the storage location information of the first data to the second node, where the storage location information includes the node on which the first data is currently located, information about a row, to which the first data belongs, in a data table, and the like.

It should be noted that, in this embodiment of the present disclosure, for any node in the system, after receiving the first query request, if the first data and the second data are both stored on the node locally, the node does not need to calculate, according to the query identifier and the preset rule, a node configured to store the first data. If neither the first data nor the second data is stored on the node locally, the node does not respond to the query request. The foregoing operation of recalculating a node for storing data corresponding to the query identifier is performed only when one of the first data and the second data is stored on the node locally.

It may be understood that, after a corresponding node that stores only a "grade", for example, the third node, receives the first query request, the corresponding node performs an operation similar to that performed by the first node. The third node determines that the second data is stored on the third node, but the first data is not stored on the third node, and the third node performs hash calculation according to the "name", to re-determine a node configured to store the second data. It should be noted that, as long as identifiers according to which hash calculation is performed are the same, storage nodes obtained by calculation are the same, that is, the node that is re-determined by the third node and that is configured to store the second data is also the second node. That is, after hash calculation is performed according to the "name", both the "grade" and the "student number" that correspond to the "name of somebody" should be re-stored on the second node. In this embodiment of the present disclosure, the first node needs to send, to the second node, only information about a storage location at which the "student number" corresponding to the "name of somebody" is located, and does not need to send, to the second node, data of the "student number" corresponding to the "name of somebody". Similarly, the third node needs to send, to the second node, only information about a storage location at which the "grade" corresponding to the "name of somebody" is located, and does not need to send, to the second node, data of the "grade" corresponding to the "name of somebody".

After the second node receives the storage location information of the first data that is sent by the first node, if the second node receives a request that is used by the service apparatus to query the first data, because the first data is not actually stored on the second node and instead is stored on the first node, the second node may send a second query request to the first node. In a feasible implementation manner, the first node may directly send the first data to the service apparatus. In another feasible implementation manner, the first node may send the first data to the second node such that the second node returns the first data to the service apparatus.

The first node may further record the hash calculation result of a data, such as the first data, the first node may further record the second node corresponding to the data. If the first node receives another query request that carries the same query identifier, the first node does not perform an operation of performing hash calculation again.

In this embodiment of the present disclosure, if the first data needs to be updated, for example, data needs to be added to or data needs to be deleted from the first data, because the first data is actually stored on the first node, an operation of updating the data is stilled performed by the first node, and after the first node adds data to or deletes data from the first data, the first node needs to recalculate, according to the query identifier, a node that corresponds to the added or deleted data, for example, the third node, and send, to the third node, storage location information of the added or deleted data.

In an implementation scenario in which third data is added to the first data, the first node receives a data addition request sent by the service apparatus, where the data addition request is used to add the third data to the first data, the first node adds the third data to the first data, and the first node determines, according to the query identifier, the third node configured to store the third data, and sends storage information of the third data to the third node.

In an implementation scenario in which fourth data is deleted from the first data The first node receives a data deletion request sent by the service apparatus, where the deletion request is used to delete the fourth data from the first data, the first node deletes the fourth data from the first data, and the first node determines, according to the query identifier, at least one fourth node that stores the fourth data, and sends storage location information of the fourth data to the corresponding fourth node.

According to the distributed data storage method provided in this embodiment, after a first node receives a query request that carries a query identifier, if first data corresponding to the query identifier is stored locally, but second data corresponding to the query identifier is not stored locally, the first node recalculates, according to the query identifier and a preset calculation rule, a second node configured to store the first data, the first node does not need to send the first data to the second node, and instead, sends storage location information of the first data to the second node, the second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

Detailed descriptions are provided below using an example in which data stored on a node exists in a form of a data table. Each data table includes one or more column attributes and several pieces of row data, and each piece of row data may include data values corresponding to some or all column attributes. For example, a data table includes names and student numbers of several students, and another data table includes names and grades of several students. Each data table may be stored on one or more nodes in a distributed manner, each node may store several pieces of row data of a data table, hash calculation may be performed using an identifier for the data table stored in a distributed manner, to determine nodes that store pieces of row data in the data table, and the row data is sent to different nodes for storage. For example, hash calculation is performed according to a student number for a data table including names and student numbers of several students, and it is obtained by calculation that row data corresponding to student numbers 1 to 10 is stored on the first node, and row data corresponding to student numbers 11 to 20 is stored on the second node, and so on.

According to the foregoing example, a query identifier in a first data query request may be a data value of a column attribute in a data table. For example, a first data table includes names and student numbers of several students, a column attribute in the first data table is "name", and in this case, a data value of the column attribute may be "Zhang San". A second data table includes names and grades of several students, there is also a column attribute "name" in the second data table, and in this case, a data value of the column attribute may be "Zhang San". In this case, the first data may be a student number corresponding to "Zhang San", and the second data may be a grade corresponding to "Zhang San". The "name" included in the first data table and the "name" included in the second data table point to a same student, and the "name" data columns are referred to as associated columns of the first data table and the second data table.

In an embodiment, a range of data values in the associated column in the first data table, that is, a range of the first data, may be determined according to the query identifier, similarly, a range of data values in the associated column in the second data table, that is, a range of the second data, may also be determined according to the query identifier, which may be performed in the following manners: 1) The query identifier may directly include the range of the data values in the associated column in the first data table, an intersection set is obtained between the range and a range of all data values in the associated column in the first data table, and an obtained range of data values in the associated column is a first query range. In one embodiment, the range of data values in the associated column in the first data table that is directly included in the query identifier may be a universal set of data in the associated column in the first data table.

(2) The query identifier may include a range of data values of another column in the first data table except the associated column, the range of the data values in the associated column in the first data table is determined using the range, and the obtained range of data values in the associated column is a first query range.

(3) The query identifier may directly include the range of the data values in the associated column in the second data table, an intersection set is obtained between the range and a range of all data values in the associated column in the second data table, and an obtained range of data values in the associated column is a second query range. In one embodiment, the range of the data values in the associated column in the second data table that is directly included in the query identifier may be a universal set of data in the associated column in the second data table.

(4) The query identifier may include a range of data values of another column in the second data table except the associated column, the range of the data values in the associated column in the second data table is determined using the range, and the obtained range of data values in the associated column is a second query range.

(5) The query identifier may include both a range of data values of another column in the first data table except the associated column and a range of data values of another column in the second data table except the associated column, and a first query range and a second query range are respectively obtained using the ranges.

(6) The query identifier includes a range of data values of a column of another data table, and a first query range of the first data table is obtained using a relationship between the another data table and the first data table.

(7) The query identifier includes a range of data values of a column of another data table, and a second query range of the second data table is obtained using a relationship between the another data table and the second data table.

For example, the first data table may be T1, and includes column attributes T1_A and T1_B, and the second data table may be T2, and includes column attributes T2_B and T2_C, where T1_B and T2_B are associated columns. If all data of T2_C when T1_B is equal to T2_B in the table T1 and the table T2 needs to be queried for by means of a first data query request, the query identifier may be a range of data values that are in the associated columns and that satisfy a query condition "T1_B=T2_B", that is, an intersection set of data values in the column T1_B and data values in the column T2_B, which is equivalent to that the query identifier is an intersection set of data values in the associated column in the first data table and data values in the associated column in the second data table, and a returned identifier is T2_C.

For another example, T1 may further include a column attribute T1_C, and if all data of T2_C when T2_B in T2 is equal to T1_B in the row data whose data value in T1_C belongs to a set X in T1, the query identifier is used to determine a first query range of data values of T1_B.

In the foregoing manners, (3), (4), and (7) may be summarized as methods of (1), (2), and (6), which are equivalent to a case in which the second data table is used as the first data table, and related steps in this embodiment of the present disclosure may be performed using the second data table as the first data table, and details are not described herein again.

Row data, which corresponds to a range of data values in the associated columns that is determined by an intersection set of any first query range and second query range above, of the first data table and the second data table is actually row data corresponding to data requested in the first data query request. Storage locations of row data that satisfies the first query range and that corresponds to a data value of the associated column of the first data table and row data that satisfies the second query range and that corresponds to a data value of the associated column of the second data table may be the following cases:

(1) Row data that is in the first data table and that satisfies the first query range and corresponds to data values of the associated column is stored on one node.

(2) Row data that is in the second data table and that satisfies the second query range and corresponds to data values of the associated column is stored on one node.

(3) Row data that is in the first data table and that satisfies the first query range and corresponds to data values of the associated column is separately stored on different nodes, where row data corresponding to a same data value is stored on a same node, which is equivalent to a case in which the first data table uses the associated column as a reference column in original partition.

(4) Row data that is in the second data table and that satisfies the second query range and corresponds to data values of the associated column is separately stored on different nodes, where row data corresponding to a same data value is stored on a same node, which is equivalent to a case in which original hash calculation is performed for the second data table using the associated column.

(5) Row data that is in the first data table and that satisfies the first query range and corresponds to data values of the associated column is separately stored on different nodes, where row data corresponding to a same data value is stored on different nodes, which is equivalent to a case in which original hash calculation is not performed for the first data table using the associated column.

(6) Row data that is in the second data table and that satisfies the second query range and corresponds to data values of the associated column is separately stored on different nodes, where row data corresponding to a same data value is stored on different nodes, which is equivalent to a case in which original hash calculation is not performed for the second data table using the associated column.

For example, the first query request involves a query of data in the data table T1 and the table T2, T1 includes row data T1_oid1 to T1_oid5, data values in the associated column T1_B are A, B, C, D, and A, and during initial distributed storage, T1_oid1, T1_oid3, and T1_oid5 are stored on a node Node1, and T1_oid2 and T1_oid4 are stored on a node Node2, as shown in Table 1-1.

TABLE 1-1

|  | T1_B | T1_1_NID | T1_1_OID |
| --- | --- | --- | --- |
| T1_oid1 | A | Node1 | Node1_Oid1 |
| T1_oid2 | B | Node2 | Node2_Oid1 |
| T1_oid3 | C | Node1 | Node1_Oid2 |
| T1_oid4 | D | Node2 | Node2_Oid2 |
| T1_oid5 | A | Node1 | Node1_Oid3 |

T2 includes row data T2_oid1 to T2_oid5, data values in the associated column T2_B are A, B, C, D, and D, and during initial distributed storage, T2_oid1 and T2_oid3 are stored on the node Node1, and T2_oid2, T2_oid4, and T2_oid5 are stored on the node Node2, as shown in Table 1-2.

TABLE 1-2

|  | T2_B | T2_1_NID |
| --- | --- | --- |
| T2_oid1 | A | Node1 |
| T2_oid2 | B | Node2 |
| T2_oid3 | C | Node1 |
| T2_oid4 | D | Node2 |
| T2_oid5 | D | Node2 |

If the first query range determined by the query identifier carried in the first data query request is data values A and C in the column T1_B, row data that satisfies the first query range and that corresponds to the data values of the associated column of the first data table is all stored on one node, which belongs to the foregoing case (1).

If the second query range determined by the query identifier carried in the first data query request is data values A and C in the column T2_B, row data that satisfies the second query range and that corresponds to the data values of the associated column of the second data table is all stored on one node, which belongs to the foregoing case (2).

If the first query range determined by the query identifier carried in the first data query request is data values A and B in the column T1_B, row data that satisfies the first query range and that corresponds to the data values of the associated column of the first data table is separately stored on different nodes, which belongs to the foregoing case (3).

If the second query range determined by the query identifier carried in the first data query request is data values A and B in the column T2_B, row data that satisfies the second query range and that corresponds to the data values of the associated column of the second data table is separately stored on different nodes, which belongs to the foregoing case (4).

For another example, an associated query is performed on the data table T1 and the table T2, T1 includes row data T1_oid1 to T1_oid5, data values in the associated column T1_B are A, B, C, D, and A, and during initial distributed storage, T1_oid1 and T1_oid3 are stored on a node Node1, and T1_oid2, T1_oid4, and T1_oid5 are stored on a node Node2, as shown in Table 1-3.

TABLE 1-3

|         | T1_B | T1_1_NID |
|---------|------|----------|
| T1_oid1 | A    | Node1    |
| T1_oid2 | B    | Node2    |
| T1_oid3 | C    | Node1    |
| T1_oid4 | D    | Node2    |
| T1_oid5 | A    | Node2    |

T2 includes row data T2_oid1 to T2_oid5, data values in the associated column T2_B are A, B, C, D, and C, and during initial distributed storage, T2_oid1 and T2_oid3 are stored on the node Node1, and T2_oid2, T2_oid4, and T2_oid5 are stored on the node Node2, as shown in Table 1-4.

TABLE 1-4

|         | T2_B | T2_1_NID |
|---------|------|----------|
| T2_oid1 | A    | Node1    |
| T2_oid2 | B    | Node2    |
| T2_oid3 | C    | Node1    |
| T2_oid4 | D    | Node2    |
| T2_oid5 | C    | Node2    |

If the first query range determined by the query identifier carried in the first data query request is data values A and C in the column T1_B, row data that satisfies the first query range and that corresponds to the data values of the associated column is stored on different nodes, where row data corresponding to a same data value is stored on different nodes, which belongs to the foregoing case (5).

If the second query range determined by the query identifier carried in the first data query request is data values A and C in the column T2_B, row data that satisfies the first query range and that corresponds to the data values of the associated column is separately stored on different nodes, where row data corresponding to a same data value is stored on different nodes, which belongs to the foregoing case (6).

In the foregoing storage case, if it is satisfied that data of both the first query range and the second query range of the query identifier is stored on one node, the storage node performs an action of obtaining an intersection set of data values in the first query range and the second query range, and determines row data corresponding to the query identifier of the first data query request.

If it is satisfied that data of the first query range and the second query range of the query identifier is separately stored on two nodes, data values of associated columns of the first query range and the second query range need to be placed on one node, to perform an action of obtaining an intersection set, to determine row data corresponding to the query identifier of the first data query request.

If row data corresponding to some data values in the first query range and row data corresponding to the some data values in the second query range are not stored on a same node, row data that corresponds to the some data values in the first query range and the some data values in the second query range needs to be placed on a same node, to perform an action of obtaining an intersection set, to determine row data corresponding to the query identifier of the first data query request.

Similarly, for a storage case of the second query range that is similar to that of the first query range, reference may be made to the three storage cases of the first query range, to perform similar processing, and details are not described herein again.

The first node may obtain the first query range of the first data table according to the query identifier, that is, a range of data values that satisfy the query identifier and that are in the associated column of the first data table.

For example, the data value C in the column T2_B in Table 1-4 corresponds to two pieces of row data T2_oid3 and T2_oid5 in T2, which are respectively stored on Node1 and Node2.

Therefore, the first node may determine that the first data that corresponds to the query identifier and that is in the first data table is stored on the first node, and the second data that corresponds to the query identifier and that is in the second data table is not stored on the first node. Similarly, the first node may use the second data table as the first data table, and determine whether first data and second data of the second data table exist.

In one embodiment, the first data may be one or more pieces of row data.

For example, T1 and T2 in Table 1-3 and Table 1-4 are queried, and the first query range that is determined by the query identifier and that is of data values in the associated column of the first data table is A, B, C, and D. If Node1 is used as the first node, data values that are locally stored on Node1 and that are in the column T1_B in the first data table and satisfy the first query range are A and C, and Node1 performs hash calculation for the locally stored data values in the associated column of the first data table, and determines a new distributed storage node. As shown in Table 2-1, the new distributed storage node corresponding to the data value C is Node2 and is not the original storage node Node1. In this case, row data corresponding to the data value C is the first data, and a second node corresponding to the data value C in the first data table is Node2.

TABLE 2-1

|         | T1_B | T1_1_NID | T1_2_NID |
|---------|------|----------|----------|
| T1_oid1 | A    | Node1    | Node1    |
| T1_oid2 | B    | Node2    | Node1    |
| T1_oid3 | C    | Node1    | Node2    |
| T1_oid4 | D    | Node2    | Node1    |
| T1_oid5 | A    | Node2    | Node2    |

Similarly, Node2 may also be the first node, Node2 similarly determines the first query range of data values in the associated column of the first data table according to the query identifier in the first data query request, and Node2 determines that locally stored data values that are in the column T1_B in the first data table and that satisfy the first query range are A, B, and D. A calculated new distributed storage node of the data values B and D is Node1 and is not the original storage node Node2. In this case, row data corresponding to the data values B and D is the first data, and second nodes corresponding to the data values B and D in the first data table are both Node1.

Similarly, the first node may be one of original storage nodes of the second data table, performs a step similar to that performed by an original storage node of the first data table, and determines a new distributed storage node of a determined data value that is in the associated column of the second data table and that satisfies the query identifier.

Several specific embodiments are used in the following to describe in detail the method provided in the foregoing embodiment.

Assuming that a distributed database system stores data tables T1, T2, and T3, where T1 includes column attributes T1_A and T1_B, T2 includes column attributes T2_A, T2_C, and T2_D, and T3 includes column attributes T3_C and T3_E, T1 and T2 have columns of a same attribute, and T2 and T3 have columns of a same attribute, that is, T1_A and T2_A may be associated columns, and T2_C and T3_C may be associated columns.

T1 includes row data T1_oid1 to T1_oid4, T2 includes row data T2_oid1 to T2_oid8, and T3 includes row data T3_oid1 to T3_oid2, original hash calculation is separately performed for each data table according to T1_A, T2_A, and T3_C, and a node for storing each piece of row data of each data table is determined, as shown in Table 3-1 to Table 3-3.

TABLE 3-1

|  | T1_A | T1_B | T1_1_NID | T1_1_OID |
|---|---|---|---|---|
| T1_oid1 | 1 | A | Node1 | 1 |
| T1_oid2 | 2 | B | Node2 | 2 |
| T1_oid3 | 3 | C | Node1 | 1 |
| T1_oid4 | 4 | D | Node2 | 2 |

TABLE 3-2

|  | T2_A | T2_C | T2_D | T2_1_NID | T2_1_OID |
|---|---|---|---|---|---|
| T2_oid3 | 2 | C | X | Node2 | 1 |
| T2_oid4 | 2 | D | X | Node2 | 2 |
| T2_oid5 | 3 | E | X | Node1 | 3 |
| T2_oid6 | 3 | F | X | Node1 | 4 |

TABLE 3-3

|  | T3_C | T3_E | T3_1_NID | T3_1_OID |
|---|---|---|---|---|
| T3_oid3 | F | ff | Node2 | 1 |
| T3_oid4 | G | gg | Node2 | 2 |

T1_1_NID, T2_1_NID, and T3_1_NID are storage nodes respectively obtained after original hash calculation is performed for T1, T2, and T3, and T1_1_OID, T2_1_OID, and T3_1_OID are row numbers that are on the storage nodes and that are respectively obtained after original hash calculation is performed for T1, T2, and T3.

Figure 2A:
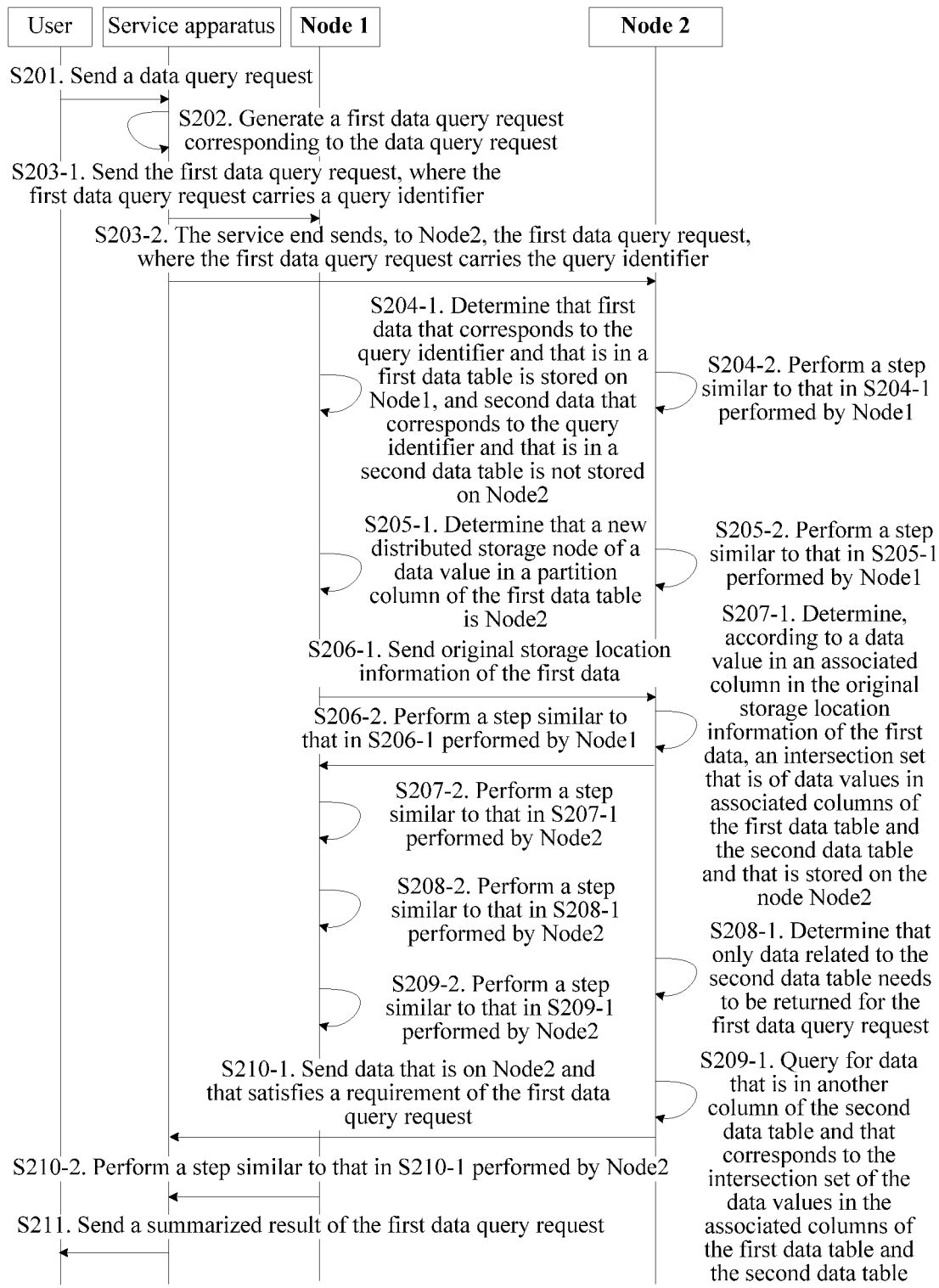
FIG. 2A is a flowchart of another embodiment of a distributed data storage method according to the present disclosure.

FIG. 2A is a flowchart of another embodiment of a distributed data storage method according to the present disclosure.

S201. A user sends a data query request to a service apparatus using a client.

S202. The service apparatus generates a first data query request corresponding to the data query request.

The first data query request generated by the service apparatus is, for example:

Select T3_C,T3_E
from T2,T3
Where T2_C=T3_C.

S203-1. The service apparatus sends, to Node1, the first data query request, where the first data query request carries a query identifier.

S203-2. The service apparatus sends, to Node2, the first data query request, where the first data query request carries the query identifier.

S204-1. Node1 determines that first data that corresponds to the query identifier and that is in a first data table is stored on Node1, and second data that corresponds to the query identifier and that is in a second data table is not stored on Node2.

As shown in Table 3-4, Node1 determines that a distributed storage node re-determined by performing hash calculation for a locally stored data value that is in associated columns of the first data table and the second data table and that is in the first data table T2 is not an original storage node, identifies row data corresponding to this part of data as the first data. In this way, row data that is locally stored on Node1 and that corresponds to data values "E" and "F" in a column T2_C of the first data table T2 is the first data that is on Node1 and that corresponds to the query identifier in the first data query request. In Table 3-4, T2_New_NID is the new distributed storage node, and In one embodiment, Node1 may directly record a column attribute, for which original hash calculation has been performed, in the first data table, and determine whether the column attribute is an associated column, to determine whether a new distributed storage node needs to be calculated for the first data table.

TABLE 3-4

| T2_C | T2_1_NID | T2_1_OID | T2_New_NID |
|---|---|---|---|
| E | Node1 | 3 | Node2 |
| F | Node1 | 4 | Node2 |

S204-2. Node2 performs a step similar to that in S204-1 performed by Node1.

As shown in Table 3-5, row data that is on Node2 and that corresponds to data values "C" and "D" in a column T2_C in the first data table T2 is first data that is on Node2 and that corresponds to the query identifier in the first data query request.

TABLE 3-5

| T2_C | T2_1_NID | T2_1_OID | T2_New_NID |
|---|---|---|---|
| C | Node2 | 1 | Node1 |
| D | Node2 | 2 | Node1 |

S205-1. Node1 determines that a new distributed storage node is Node2.

A new distributed node that is re-determined is shown in Table 3-4.

S205-2. Node2 performs a step similar to that in S205-1 performed by Node1.

S206-1. Node1 sends original storage location information of the first data to Node2.

The original storage location information of the first data that is sent by Node1 to Node2 is shown in Table 3-6.

TABLE 3-6

| T2_C | T2_1_NID | T2_1_OID |
|---|---|---|
| E | Node1 | 3 |
| F | Node1 | 4 |

S206-2. Node2 performs a step similar to that in S206-1 performed by Node1.

Original storage location information of the first data that is sent by Node2 to Node1 is shown in Table 3-7.

TABLE 3-7

| T2_C | T2_1_NID | T2_1_OID |
|---|---|---|
| C | Node2 | 1 |
| D | Node2 | 2 |

S207-1. Node2 determines, according to a data value in an associated column in the original storage location information of the first data, an intersection set that is of data values in associated columns of the first data table and the second data table and that is stored on the node Node2.

The original storage location information of the first data that is received by Node2 is shown in Table 3-6, and second data that is stored on Node2 and that corresponds to the first data is shown in Table 3-8.

TABLE 3-8

| T3_C | T3_1_NID | T3_1_OID |
|---|---|---|
| F | Node2 | 1 |
| G | Node2 | 2 |

Node2 determines that an intersection set of data values that are stored on Node2, that satisfy the first data query request, and that are in T2_C and T3_C is "F".

In one embodiment, if Node2 further stores locally other data that satisfies the first data query request and that is in the first data table, an intersection set of the original storage location information of the first data, and data that is locally stored on Node2 and that is in the first data table and data that is stored on Node2 and that is in an associated column of the second data table may be obtained.

S207-2. Node1 performs a step similar to that in S207-1 performed by Node2.

An intersection set obtained by Node1 is empty.

S208-1. Node2 determines that only data related to the second data table needs to be returned for the first data query request.

Identifiers that need to be returned for the first data query request is T3_C and T3_E, which are both column attributes of the second data table.

S208-2. Node1 performs a step similar to that in S208-1 performed by Node2.

S209-1. Node2 queries for data that is in another column of the second data table and that corresponds to the intersection set of the data values in the associated columns of the first data table and the second data table.

Data values that are in T3_C and T3_E of the second data table and that correspond to the intersection set "F" of the data values and are determined by Node2 are shown in Table 3-9.

TABLE 3-9

| T3_C | T3_E |
|---|---|
| F | ff |

S209-2. Node1 performs a step similar to that in S209-1 performed by Node2.

S210-1. Node2 sends, to the service apparatus, data that is on Node2 and that satisfies a requirement of the first data query request.

The returned data is shown in Table 3-9.

S210-2. Node1 performs a step similar to that in S210-1 performed by Node2.

S211. The service apparatus sends a summarized result of the first data query request to the client.

In one embodiment, if the first query range of the first data table determined by the query identifier of the first data query request in S202 includes only data values in an associated column of the first data table, S204-2, S205-2, S206-2, S207-2, S208-2, S209-2, S210-2 may not need to be performed. For example:

Select T3_S,T3_E
from T2,T3
Where T2_C=T3_C AND T2_A<2.

Figure 2B:
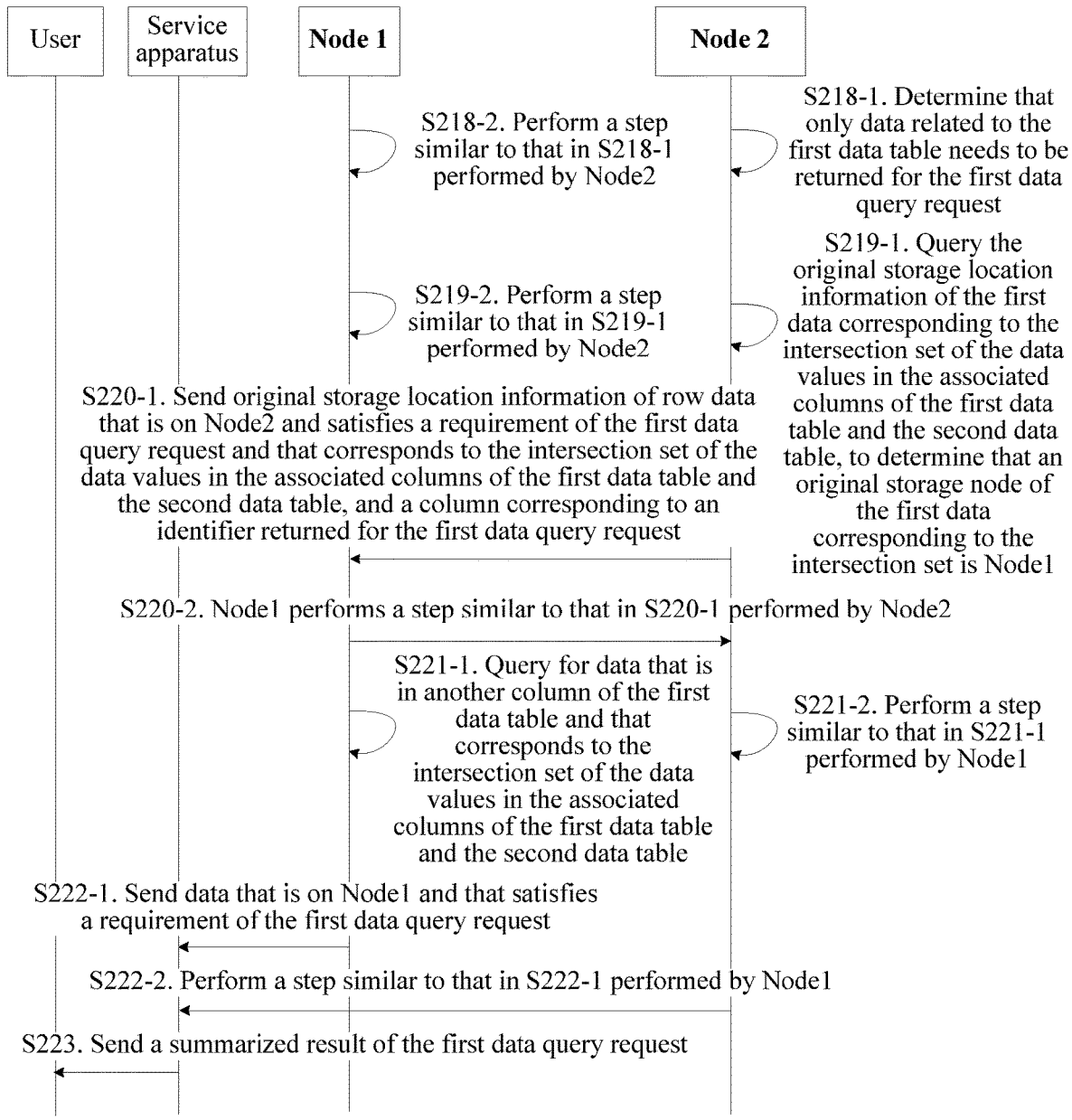
FIG. 2B is a flowchart of a third embodiment of a distributed data storage method according to the present disclosure.

FIG. 2B is a flowchart of a third embodiment of a distributed data storage method according to the present disclosure.

In one embodiment, if the first data query request in S202 is:

Select T2_B,T2_C
from T2,T3
Where T2_C=T3_S, after S207-1, the method includes:

S218-1. Node2 determines that only data related to the first data table needs to be returned for the first data query request.

S218-2. Node1 performs a step similar to that in S218-1 performed by Node2.

S219-1. Node2 queries the original storage location information of the first data corresponding to the intersection set of the data values in the associated columns of the first data table and the second data table, to determine that an original storage node of the first data corresponding to the intersection set is Node1.

S219-2. Node1 performs a step similar to that in S219-1 performed by Node2.

S220-1. Node2 sends, to Node1, original storage location information of row data that is on Node2 and satisfies a requirement of the first data query request and that corresponds to the intersection set of the data values in the associated columns of the first data table and the second data table, and a column corresponding to an identifier returned for the first data query request.

S220-2. Node1 performs a step similar to that in S220-1 performed by Node2.

S221-1. Node1 queries for data that is in another column of the first data table and that corresponds to the intersection set of the data values in the associated columns of the first data table and the second data table.

S221-2. Node2 performs a step similar to that in S221-1 performed by Node1.

S222-1. Node1 sends, to the service apparatus, data that is on Node1 and that satisfies a requirement of the first data query request.

S222-2. Node2 performs a step similar to that in S222-1 performed by Node1.

S223. The service apparatus sends a summarized result of the first data query request to the user.

In one embodiment, if the first query range of the first data table determined by the query identifier of the first data query request in S202 includes only data values in an associated column of the first data table, S204-2, S205-2, S206-2, S207-2, S218-2, S219-2, S221-2, and S222-2 may not need to be performed. For example:

Select T2_B,T2_C
from T2,T3
Where T2_C=T3_C AND T2_A<2.

Figure 2C:
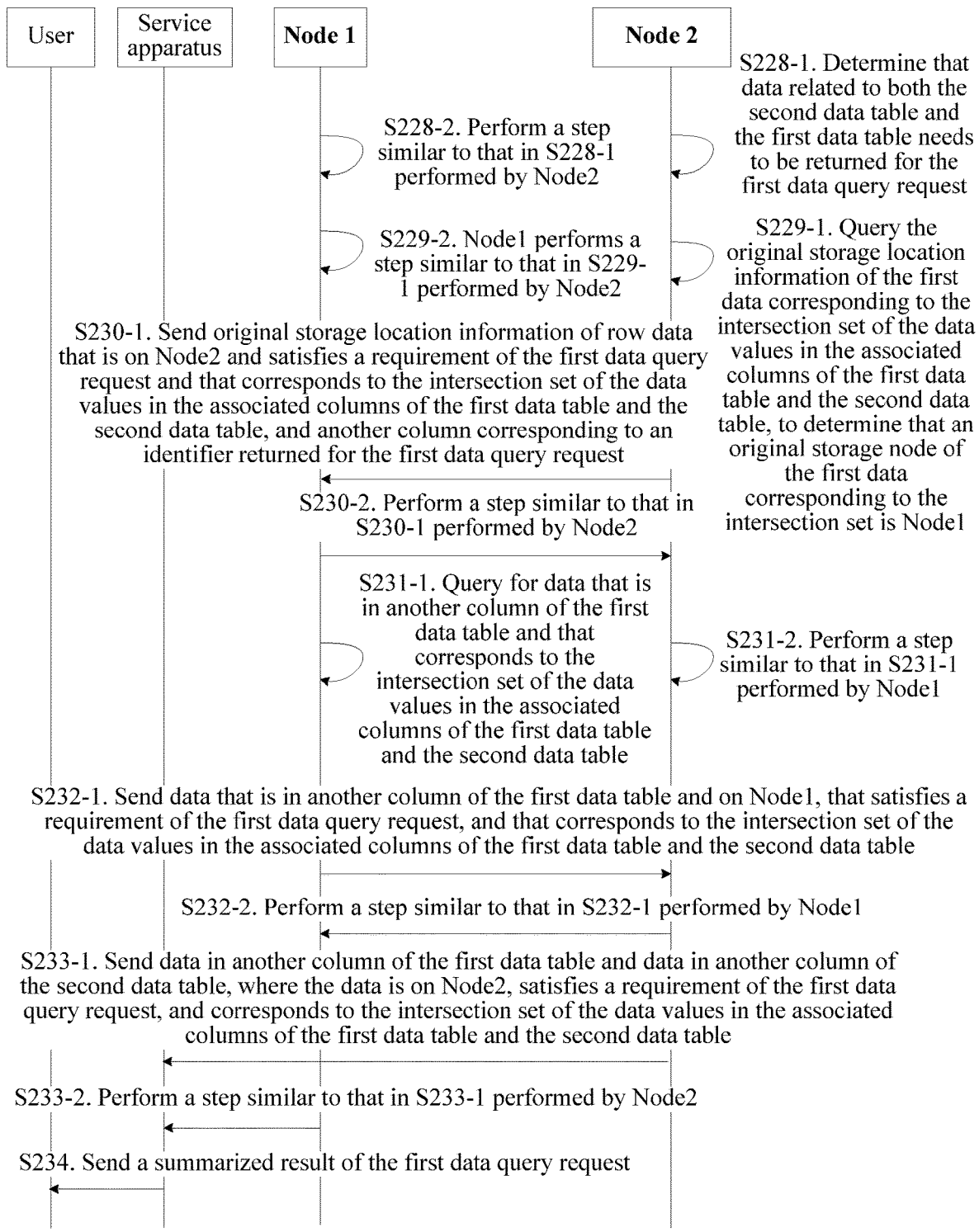
FIG. 2C is a flowchart of a fourth embodiment of a distributed data storage method according to the present disclosure.

FIG. 2C is a flowchart of a fourth embodiment of a distributed data storage method according to the present disclosure.

In one embodiment, if the first data query request in S202 is:
Select T2_C,T3_E
from T2,T3
Where T2_C=T3_C,
after S207-1, the method further includes:

S228-1. Node2 determines that data related to both the second data table and the first data table needs to be returned for the first data query request.

S228-2. Node1 performs a step similar to that in S228-1 performed by Node2.

S229-1. Node2 queries the original storage location information of the first data corresponding to the intersection set of the data values in the associated columns of the first data table and the second data table, to determine that an original storage node of the first data corresponding to the intersection set is Node1.

S229-2. Node1 performs a step similar to that in S229-1 performed by Node2.

S230-1. Node2 sends, to Node1, original storage location information of row data that is on Node2 and satisfies a requirement of the first data query request and that corresponds to the intersection set of the data values in the associated columns of the first data table and the second data table, and another column corresponding to an identifier returned for the first data query request.

S230-2. Node1 performs a step similar to that in S230-1 performed by Node2.

S231-1. Node1 queries for data that is in another column of the first data table and that corresponds to the intersection set of the data values in the associated columns of the first data table and the second data table.

S231-2. Node2 performs a step similar to that in S231-1 performed by Node1.

S232-1. Node1 sends, to Node2, data that is in another column of the first data table and on Node1, that satisfies a requirement of the first data query request, and that corresponds to the intersection set of the data values in the associated columns of the first data table and the second data table.

S232-2. Node2 performs a step similar to that in S232-1 performed by Node1.

S233-1. Node2 sends data in another column of the first data table and data in another column of the second data table to the service apparatus, where the data is on Node2, satisfies a requirement of the first data query request, and corresponds to the intersection set of the data values in the associated columns of the first data table and the second data table.

S233-2. Node1 performs a step similar to that in S233-1 performed by Node2.

S234. The service apparatus sends a summarized result of the first data query request to the user.

In one embodiment, if the first query range of the first data table determined by the query identifier of the first data query request in S202 includes only data values in an associated column of the first data table, S204-2, S205-2, S205-2, S206-2, S207-2, S228-2, S229-2, S231-2, S232-2, and S233-2 may not need to be performed. For example:
Select T2_B,T2_C
from T2,T3
Where T2_C=T3_C AND T2_A<2.

Figure 2D:
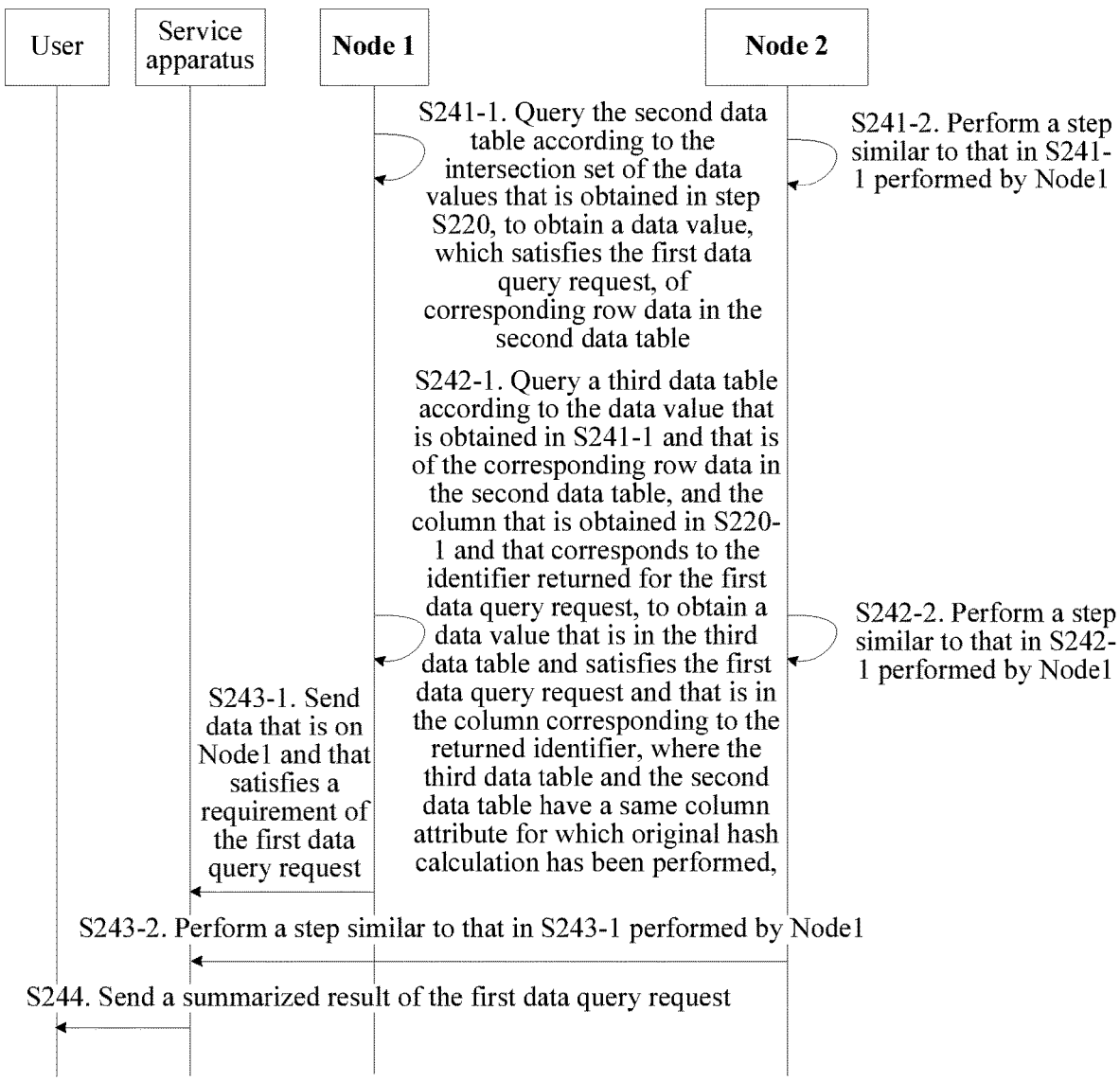
FIG. 2D is a flowchart of a fifth embodiment of a distributed data storage method according to the present disclosure.

FIG. 2D is a flowchart of a fifth embodiment of a distributed data storage method according to the present disclosure.

In one embodiment, if the first data query request in S202 is:
Select T1_A,T2_B
from T1,T2,T3
Where T2_C=T3_C AND T1_A=T2_A, where
because original partition columns used for T1 and T2 are associated columns, that is, row data corresponding to a same data value in associated columns is all stored on a same node, the distributed database node may first obtain an intersection set of data values in a column T2_C and a column T3_C, then obtain an intersection set of data values that are in row data corresponding to the intersection set in T2 and that are in a column T2_A, and data values in a column T1_A, and finally send the intersection set to the service apparatus, after S220-1, the method further includes:

S241-1. Node1 queries the second data table according to the intersection set of the data values that is obtained in step S220, to obtain a data value, which satisfies the first data query request, of corresponding row data in the second data table.

S241-2. Node2 performs a step similar to that in S241-1 performed by Node1.

S242-1. Node1 queries a third data table according to the data value that is obtained in S241-1 and that is of the corresponding row data in the second data table, and the column that is obtained in S220-1 and that corresponds to the identifier returned for the first data query request, to obtain a data value that is in the third data table and satisfies the first data query request and that is in the column corresponding to the returned identifier, where the third data table and the second data table have a same column attribute for which original hash calculation has been performed.

S242-2. Node2 performs a step similar to that in S242-1 performed by Node1.

S243-1. Node1 sends, to the service apparatus, data that is in another column related to the first data table and is on Node1, that satisfies a requirement of the first data query request, and that corresponds to the intersection set of the data values in the associated columns of the first data table and the second data table.

S243-2. Node2 performs a step similar to that in S243-1 performed by Node1.

S244. The service apparatus sends a summarized result of the first data query request to the user.

In one embodiment, after S206-1 or S206-2, if the user initiates an associated query request about the first data table and the second data table, the distributed database node does not need to perform again the step of sending original storage location information of the first data, and only needs to perform a subsequent step for an associated query according to the original storage location information of the first data that is recorded when S206-1 or S206-2 is performed for the first time.

In one embodiment, T3 further includes a column attribute T3_F, and T3_F is an original partition column in T3, that is, an original partition column of the second data table is not the associated column of the first data table and the second data table, as shown in Table 3-6.

TABLE 3-6

|  | T3_C | T3_F | T3_1_NID | T3_1_OID |
|---|---|---|---|---|
| T3_oid1 | A | 1 | Node1 | 1 |
| T3_oid2 | C | 2 | Node2 | 1 |

TABLE 3-6-continued

| | T3_C | T3_F | T3_1_NID | T3_1_OID |
|---|---|---|---|---|
| T3_oid3 | F | 3 | Node1 | 2 |
| T3_oid4 | G | 4 | Node2 | 2 |

After S203-1, the method further includes the following steps:

S254-1. Node1 and Node2 separately send, to a re-determined distributed storage node, original storage location information of row data queried for by means of the first data query request.

A distributed storage node re-determined by Node1 is shown in Table 3-7, and T3_NEW_NID represents a distributed storage node re-determined for a data value in an associated column in T3.

TABLE 3-7

| T3_C | T3_F | T3_1_NID | T3_1_OID | T3_NEW_NID |
|---|---|---|---|---|
| A | 1 | Node1 | 1 | Node1 |
| F | 3 | Node1 | 2 | Node2 |

S254-2. Node2 performs a step similar to that in S254-1.
A distributed storage node re-determined by Node2 is shown in Table 3-8.

TABLE 3-8

| T3_C | T3_F | T3_1_NID | T3_1_OID | T3_NEW_NID |
|---|---|---|---|---|
| C | 2 | Node2 | | Node1 |
| G | 4 | Node2 | 1 | Node2 |

For subsequent processing, reference may be made to the foregoing implementation manner, and details are not described herein again.

In one embodiment, if the first data table or the second data table is not stored in a distributed manner, after S203-1, the method includes the following steps:

S264. After a node that stores the first data table or the second data table that is not stored in a distributed manner selects an associated column of the first data table or the second data table as a partition column and performs original partition, perform related steps in the present disclosure.

For subsequent processing, reference may be made to the foregoing implementation manner, and details are not described herein again.

Figure 3:
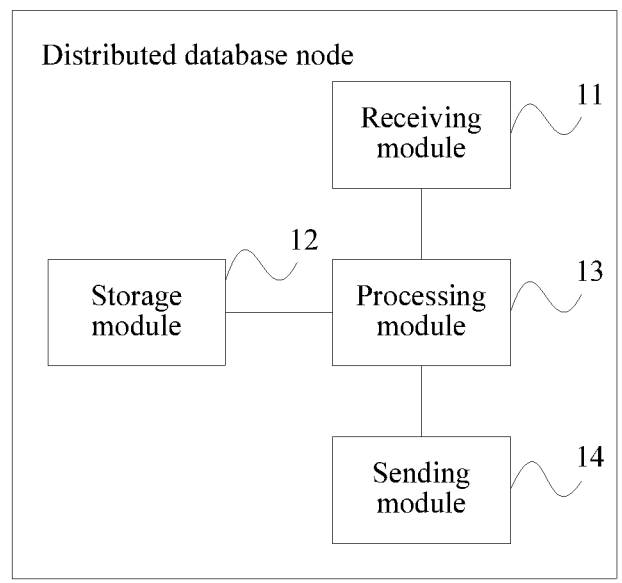
FIG. 3 is a schematic structural diagram of an embodiment of a distributed database node according to the present disclosure.

FIG. 3 is a schematic structural diagram of an embodiment of a distributed database node according to the present disclosure. As shown in FIG. 3, a distributed system includes a service apparatus and multiple distributed database nodes, the multiple distributed database nodes are used for distributed data storage, the service apparatus is configured to access data stored on the distributed database node, and the distributed database node includes a receiving module 11 configured to receive a first query request sent by the service apparatus, where the first query request carries a query identifier, and the query identifier corresponds to first data and second data, a storage module 12 configured to store data, a processing module 13 configured to if the storage module stores the first data and does not store the second data, obtain, according to the query identifier and a preset calculation rule, a second node configured to store the first data, and a sending module 14 configured to send storage location information of the first data to the second node.

In one embodiment, the receiving module 11 may be further configured to receive a second query request sent by the second node, where the second query request is sent by the second node after the second node receives a request that is used by the service apparatus to query the first data, and the sending module 14 may be further configured to send the first data to the service apparatus.

In one embodiment, the receiving module 11 may be further configured to receive a second query request sent by the second node, where the second query request is sent by the second node after the second node receives a request that is used by the service apparatus to query the first data, and the sending module 14 may be further configured to send the first data to the second node such that the second node returns the first data to the service apparatus.

In one embodiment, the receiving module 11 may be further configured to receive a data addition request sent by the service apparatus, where the data addition request is used to add third data to the first data, the processing module 13 may be further configured to add the third data to the first data stored in the storage module, the processing module 13 may be further configured to determine, according to the query identifier, a third node configured to store the third data, and the sending module 14 may be further configured to send storage information of the third data to the third node.

In one embodiment, the receiving module 11 may be further configured to receive a data deletion request sent by the service apparatus, where the deletion request is used to delete fourth data from the first data, the processing module 13 may be further configured to delete the fourth data from the first data stored in the storage module, the processing module 13 may be further configured to determine, according to the query identifier, at least one fourth node that stores the fourth data, and the sending module 14 may be further configured to send storage location information of the fourth data to the corresponding fourth node.

In one embodiment, the processing module 13 may be configured to perform hash calculation according to the query identifier, to determine the second node configured to store the first data.

The distributed database node provided in this embodiment is a device for executing the distributed data storage method provided in the present disclosure, for a specific process of executing the foregoing method, reference may be made to related descriptions of the embodiments shown in FIG. 1 and FIG. 2A, FIG. 2B, FIG. 2C and FIG. 2D, and details are not described herein again.

According to the distributed database node provided in this embodiment, after a first node receives a query request that carries a query identifier, if first data corresponding to the query identifier is stored locally, but second data corresponding to the query identifier is not stored locally, the first node recalculates, according to the query identifier and a preset calculation rule, a second node configured to store the first data, the first node does not need to send the first data to the second node, and instead, sends storage location information of the first data to the second node, the second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

Figure 4:
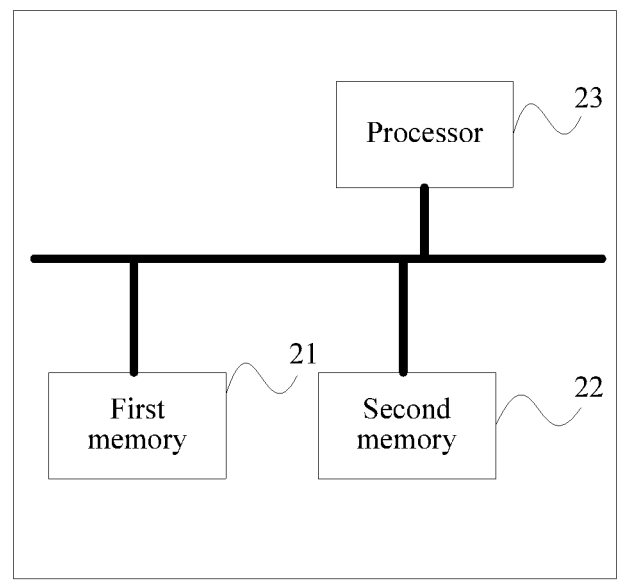
FIG. 4 is a schematic structural diagram of another embodiment of a distributed database node according to the present disclosure.

FIG. 4 is a schematic structural diagram of another embodiment of a distributed database node according to the present disclosure. As shown in FIG. 4, a distributed system includes a service apparatus and multiple distributed database nodes, the multiple distributed database nodes are used for distributed data storage, the service apparatus is configured to access data stored on the distributed database node, and the distributed database node includes a first memory 21 configured to store an instruction, a second memory 22 configured to store data, and a processor 23 configured to run the instruction stored in the first memory, to execute the following method: receiving a first query request sent by the service apparatus, where the first query request carries a query identifier, and the query identifier corresponds to first data and second data, if the second memory stores the first data and does not store the second data, obtaining, according to the query identifier and a preset calculation rule, a second node configured to store the first data, and sending storage location information of the first data to the second node.

In one embodiment, after the sending storage location information of the first data to the second node, the following may be further performed: receiving a second query request sent by the second node, where the second query request is sent by the second node after the second node receives a request that is used by the service apparatus to query the first data, and sending the first data to the service apparatus.

In one embodiment, after the sending storage location information of the first data to the second node, the following may be further performed: receiving a second query request sent by the second node, where the second query request is sent by the second node after the second node receives a request that is used by the service apparatus to query the first data, and sending the first data to the second node such that the second node returns the first data to the service apparatus.

In one embodiment, after the sending storage location information of the first data to the second node, the following may be further performed: receiving a data addition request sent by the service apparatus, where the data addition request is used to add third data to the first data, adding the third data to the first data, determining, according to the query identifier, a third node configured to store the third data, and sending storage information of the third data to the third node.

In one embodiment, after the sending storage location information of the first data to the second node, the following may be further performed: receiving a data deletion request sent by the service apparatus, where the deletion request is used to delete fourth data from the first data, deleting the fourth data from the first data, determining, according to the query identifier, at least one fourth node that stores the fourth data, and sending storage location information of the fourth data to the corresponding fourth node.

In one embodiment, the calculating, according to the query identifier, a second node configured to store the first data may be performing hash calculation according to the query identifier, to determine the second node configured to store the first data.

The distributed database node provided in this embodiment is a device for executing the distributed data storage method provided in the present disclosure, for a specific process of executing the foregoing method, reference may be made to related descriptions of the embodiments shown in FIG. 1 and FIG. 2, and details are not described herein again.

According to the distributed database node provided in this embodiment, after a first node receives a query request that carries a query identifier, if first data corresponding to the query identifier is stored locally, but second data corresponding to the query identifier is not stored locally, the first node recalculates, according to the query identifier and a preset calculation rule, a second node configured to store the first data, the first node does not need to send the first data to the second node, and instead, sends storage location information of the first data to the second node, the second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

The present disclosure provides an embodiment of a distributed data storage system, where the system includes a service apparatus and multiple distributed database nodes, the multiple distributed database nodes are used for distributed data storage, and the service apparatus is configured to access data stored on the distributed database nodes.

The present disclosure provides a schematic structural diagram of another embodiment of a distributed data storage system, where the system includes a service apparatus and multiple distributed database nodes, the multiple distributed database nodes are used for distributed data storage, and the service apparatus is configured to access data stored on the distributed database nodes.

According to the distributed data storage system provided in this embodiment, a distributed database node in the system is a device for executing the distributed data storage method provided in the present disclosure, for a specific process of executing the foregoing method, reference may be made to related descriptions of the embodiments shown in FIG. 1 and FIG. 2A, FIG. 2B, FIG. 2C and FIG. 2D, and details are not described herein again.

According to the distributed data storage system provided in this embodiment, after any first node in the system receives a query request that carries a query identifier, if first data corresponding to the query identifier is stored locally, but second data corresponding to the query identifier is not stored locally, the first node recalculates, according to the query identifier and a preset calculation rule, a second node configured to store the first data, the first node does not need to send the first data to the second node, and instead, sends storage location information of the first data to the second node, the second node obtains the first data from the first node according to the storage location information after receiving a request for querying for the first data, and if the request for querying for the first data is not received subsequently, the operation of obtaining, by the second node, the first data from the first node is not triggered. In this way, network data transmission resources are reduced and storage space is saved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method implemented by a first node in a distributed system comprising a service apparatus and a plurality of nodes, the method comprising:
   receiving, by the first node, a query request from the service apparatus, the query request comprising a query directed to a first data and a second data;
   determining, by the first node, that the first data is stored locally at the first node and that the second data is not stored locally at the first node;
   identifying, by the first node, a second node capable of locating the second data using the query identifier and a preset calculation rule when the second data is not stored locally at the first node, wherein identifying the second node using the preset calculation rule comprises performing, by the first node, a hash calculation according to the query identifier to determine the second node; and
   sending, by the first node, storage location information of the first data at the first node to the second node, wherein the storage location information of the first data includes an indication that the first data is currently located at the first node and an indication that the first data is located at a specified row in a specified data table.

2. The method according to claim 1, wherein after sending the storage location information of the first data to the second node, the method further comprises:
   receiving, by the first node, a second query request from the second node, wherein the second query request is a request to query the first data; and
   sending, by the first node, the first data to the service apparatus in response to the second query request.

3. The method according to claim 1, wherein after sending the storage location information of the first data to the second node, the method further comprises:
   receiving, by the first node, a second query request from the second node, wherein the second query request is a request to query the first data; and
   sending, by the first node, the first data to the second node in response to the second query request.

4. The method according to claim 1, further comprising:
   receiving, by the first node, a data addition request from the service apparatus, wherein the data addition request is a request to add third data to the first data;
   adding, by the first node, the third data to the first data;
   determining, by the first node according to the query identifier, a third node of the plurality of nodes that is configured to store the third data; and
   sending, by the first node, storage information of the third data to the third node.

5. The method according to claim 1, further comprising:
   receiving, by the first node, a data deletion request sent by the service apparatus, wherein the data deletion request is a request to delete fourth data from the first data;
   deleting, by the first node, the fourth data from the first data;
   determining, by the first node according to the query identifier, a fourth node of the plurality of nodes that is configured to store the fourth data; and
   sending, by the first node, storage location information of the fourth data to the fourth node.

6. A distributed database node implemented in a distributed system, the distributed database node comprising:
   a storage configured to store data;
   a memory configured to store instructions; and
   a processor coupled to the memory and configured to execute the instructions to:
      receive a query request from a service apparatus, the query request comprising a query directed to a first data and a second data;
      determine that the first data is stored locally at the distributed database node and that the second data is not stored locally at the distributed database node;
      identify a second node capable of locating the second data using the query identifier and a preset calculation rule when the second data is not stored locally at the first node, wherein identifying the second node using the preset calculation rule comprises performing a hash calculation according to the query identifier to determine the second node; and
      send storage location information of the first data at the first node to the second node, wherein the storage location information of the first data includes an indication that the first data is currently located at the first node and an indication that the first data is located at a specified row in a specified data table.

7. The node according to claim 6, wherein after sending the storage location information of the first data to the second node, the processor is further configured to execute the instructions to:
   receive a second query request from the second node, wherein the second query request is a request to query the first data; and
   send the first data to the service apparatus in response to the second query request.

8. The node according to claim 6, wherein after sending the storage location information of the first data to the second node, the processor is further configured to execute the instructions to:
   receive a second query request from the second node, wherein the second query request is a request to query the first data; and
   send the first data to the second node in response to the second query request.

9. The node according to claim 6, wherein the processor is further configured to execute the instructions to:
   receive a data addition request from the service apparatus, wherein the data addition request is a request to add third data to the first data;
   add the third data to the first data;
   determine, according to the query identifier, a third node of the plurality of nodes that is configured to store the third data; and
   send storage information of the third data to the third node.

10. The node according to claim 6, wherein the processor is further configured to execute the instructions to:
    receive a data deletion request sent by the service apparatus, wherein the data deletion request is a request to delete fourth data from the first data;
    delete the fourth data from the first data;
    determine, according to the query identifier, a fourth node of the plurality of nodes that is configured to store the fourth data; and
    send storage location information of the fourth data to the fourth node.

11. A distributed data storage system, comprising:
a first node communicatively coupled to a service apparatus and a plurality of nodes, wherein the first node is configured to:
   receive a first query request from the service apparatus, the query request comprising a query identifier directed to a first data and a second data;
   determine that the first data is stored locally at the first node and that the second data is not stored locally at the first node;
   identify a second node capable of locating the second data the query identifier and a preset calculation rule when the second data is not stored locally at the first node, wherein identifying the second node using the preset calculation rule comprises performing a hash calculation according to the query identifier to determine the second node; and
   send storage location information of the first data at the first node to the second node, wherein the storage location information of the first data includes an indication that the first data is currently located at the first node and an indication that the first data is located at a specified row in a specified data table.

12. The system according to claim 11, wherein after sending the storage location information of the first data to the second node, the first node is further configured to:
   receive a second query request from the second node after the second node receives a request that is used by the service apparatus to query the first data; and
   send the first data to the service apparatus in response to the second query request.

13. The system according to claim 11, wherein after sending the storage location information of the first data to the second node, the first node is further configured to:
   receive a second query request from the second node after the second node receives a request that is used by the service apparatus to query the first data; and
   send the first data to the second node in response to the second query request.

14. The system according to claim 11, wherein the first node is further configured to:
   receive a data addition request from the service apparatus, wherein the data addition request is a request to add third data to the first data;
   add the third data to the first data;
   determine, according to the query identifier, a third node of the plurality of nodes that is configured to store the third data; and
   send storage information of the third data to the third node.

15. The system according to claim 11, the first node is further configured to:
   receive a data deletion request sent by the service apparatus, wherein the data deletion request is a request to delete fourth data from the first data;
   delete the fourth data from the first data;
   determine, according to the query identifier, a fourth node of the plurality of nodes that is configured to store the fourth data; and
   send storage location information of the fourth data to the fourth node.

* * * * *